United States Patent Office 2,802,823
Patented Aug. 13, 1957

2,802,823

O-(CHLOROPHENYL) O-LOWER ALKYL PHOSPHOROAMIDOTHIOATES

Henry Tolkmith and Edgar C. Britton, Midland, Mich., and Clayton F. Holoway, Chicago, Ill., assignors to The Dow Chemical Company, Midland, Mich., a corporation of Delaware No Drawing. Application April 30, 1956,
Serial No. 581,361

6 Claims. (Cl. 200—239)

This invention is concerned with the O-(chlorophenyl) O-lower alkyl phosphoroamidothioates having the formula

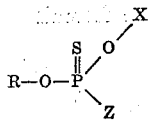

In this and succeeding formulas R represents chlorophenyl, X represents a lower alkyl radical containing not more than four carbon atoms and Z represents an aziridinyl, morpholino or pyrrolidinyl radical. These new compounds are crystalline solids or viscous liquids somewhat soluble in many organic solvents and substantially insoluble in water. They have been found to be active as parasiticides and are adapted to be employed as active toxic constituents of compositions for the control of bacteria, fungi, mites and insect organisms such as houseflies and southern army worms.

The new compounds may be prepared by reacting ethylene imine, morpholine or pyrrolidine with a phosphorochloridothioate of the formula

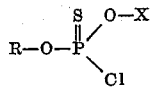

The reaction is carried out in the presence of an inert organic solvent such as acetone, methylene chloride, benzene or ether. The reaction is somewhat exothermic and takes place smoothly at the temperature range of from 0° to 50° C. with the formation of the desired product and ethylene imine, morpholine or pyrrolidine hydrochloride of reaction. The temperature may be controlled by regulating the rate of contacting the reactants and by external cooling. Good results are obtained when employing at least two molecular proportions of ethylene imine, morpholine or pyrrolidine reagent with each molecular proportion of the phosphorochloridothioate reagent. In carrying out the reaction, the ethylene imine, morpholine or pyrrolidine reagent dispersed in the reaction solvent is added portionwise to the phosphorochloridothioate reagent also dispersed in the reaction solvent. The addition is carried out with stirring and at a temperature of from 0° to 50° C. Upon completion of the reaction, the reaction mixtures may be washed with water and any reaction solvent removed by evaporation or fractional distillation under reduced pressure to obtain the desired product as a residue.

The following examples illustrate the invention but are not to be construed as a limitation thereof.

*Example 1.—O-(2,4,5-trichlorophenyl) O-methyl-1-aziridinyl phosphorothioate*

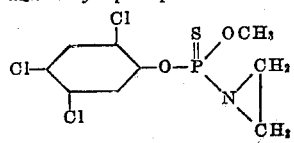

Ethylene imine (1.6 moles) diluted with 230 grams of water was added portionwise with stirring to a solution of 261 grams (0.8 mole) of O-(2,4,5-trichlorophenyl) O-methyl phosphorochloridothioate in 1500 milliliters of acetone. The addition was carried out in 2 hours and at a temperature of 5° C. The reaction mixture was then allowed to stand overnight during which time two layers separated. The solvent was removed from the top layer by evaporation under vacuum to obtain an O-(2,4,5-trichlorophenyl) O-methyl-1-aziridinyl phosphorothioate product as a white solid residue. This product was crystallized from petroleum ether having a boiling point of 30° to 60° C. and found to melt at 50°–52° C.

*Example 2.—O-(2,4,5-trichlorophenyl) O-methyl-1-pyrrolidinyl phosphorothioate*

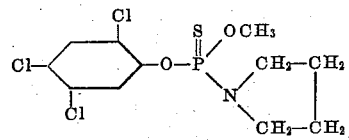

Pyrrolidine (31 grams, 0.44 mole) dissolved in 150 milliliters of acetone was added portionwise with stirring to a solution of 65.2 grams (0.2 mole) of O-(2,4,5-trichlorophenyl) O-methyl phosphorochloridothioate in 150 milliliters of acetone. The addition was carried out in 2 hours and at a temperature of 5° to 10° C. After the addition, the reaction mixture was allowed to stand overnight to complete the reaction. The reaction mixture was then washed with water and the product taken up in methylene chloride. Upon evaporation of the methylene chloride there was obtained an O-(2,4,5-trichlorophenyl) O-methyl-1-pyrrolidinyl phosphorothioate product as a brown liquid having a density of 1.3447 at 25° C.

*Example 3.—O - (2,4,5 - trichlorophenyl) O-methyl-1-morpholino phosphorothioate*

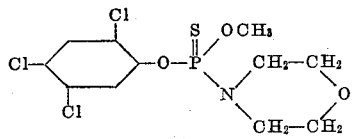

Morpholine (38 grams, 0.44 mole) dissolved in 150 milliliters of acetone was added portionwise with stirring to a solution of 65.2 grams (0.2 mole) of O-(2,4,5-trichlorophenyl) O-methyl phosphorochloridothioate in 150 milliliters of acetone. The addition was carried out in 2.5 hours and at a temperature of from 5° to 10° C. Upon completion of the reaction, the reaction mixture was washed with water and the product taken up in methylene chloride. Upon evaporation of the methylene chloride, there was obtained an O-(2,4,5-trichlorophenyl) O-methyl-1-morpholinophosphorothioate product as a thick syrup. This product was crystallized from petroleum ether and found to melt at 66°–68° C.

*Example 4.—O - (2,4,5 - trichlorophenyl) O - secondary butyl-1-morpholinophosphorothioate*

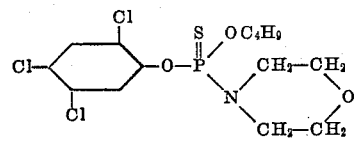

A solution of 0.18 mole of morpholine in 100 milliliters of ether was added portionwise with stirring to a solution of 0.09 mole of O-(2,4,5-trichlorophenyl) O-secondary-butyl phosphorochloridothioate in 100 milliliters of ether. The addition was carried out in one hour and at a temperature of 25° to 32° C. The reaction mixture was allowed to stand overnight before filtering. Upon evaporation of the solvent from the filtrate there was obtained an O-(2,4,5-trichlorophenyl) O-secondary-butyl-1-morpholinophosphorothioate product as a viscous, amber liquid having a density of 1.3829 at 20° C. and a refractive index of 1.5623 at 20° C.

*Example 5.—O-(4-chlorophenyl) O-methyl-1-pyrrolidinyl phosphorothioate*

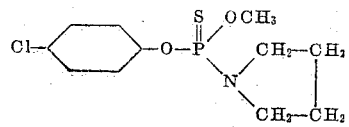

A solution of 71.1 grams (1.0 mole) of pyrrolidine in 600 milliliters of water was added portionwise with stirring to a solution of 128 grams (0.5 mole) of O-(4-chlorophenyl) O-methyl phosphorochloridothioate in 200 milliliters of acetone. The addition was carried out in 2 hours and at a temperature of 5° to 15° C. Upon completion of the reaction the acetone was evaporated under vacuum and the product taken up in methylene chloride. Upon evaporation of the methylene chloride there was obtained an O-(4-chlorophenyl) O-methyl-1-pyrrolidinyl phosphorothioate product as a light brown liquid having a density of 1.277 at 25° C. and a refractive index ($n/D$) of 1.5592 at 25° C.

In a similar manner other O-(chlorophenyl) O-lower alkyl phosphoroamidothioates may be prepared of which the following are representative:

O - (2,4 - dichlorophenyl) O-ethyl-1-morpholinophosphorothioate by the reaction of morpholine and O-(2,4-dichlorophenyl) O-ethyl phosphorochloridothioate.

O-(3,4-dichlorophenyl) O - isopropyl - 1 - pyrrolidinyl phosphorothioate by the reaction of pyrrolidine and O-(2-chlorophenyl) O-ethyl phosphorochloridothioate.

The new O-(chlorophenyl) O-lower alkyl phosphoroamidothioates are effective as parasiticides and are adapted to be employed for the control of numerous household and agricultural pests. For such use the products may be dispersed on a finely divided carrier and employed as dusts. The new products may also be employed in oils, as constituents in water emulsions or in water dispersions. In a representative operation 100 percent controls of houseflies and southern army worms have been obtained with aqueous compositions containing 500 parts by weight of O-(2,4,5-trichlorophenyl) O-methyl aziridinyl phosphorothioate per million parts by weight of water.

The O-(chlorophenyl) O-lower alkyl phosphorochloridothioates employed as starting materials may be prepared by the reaction at a temperature of from 20° to 90° C. of substantially equimolecular proportions of sodium methylate, sodium ethylate, sodium propylate or sodium butylate and an O-(chlorophenyl) phosphorodichloridothioate. In carrying out the reaction, the methanol, propanol or butanol solution of the corresponding alcoholate is added portionwise to the phosphorodichloridothioate reagent dispersed in the alcohol. This operation is carried out with stirring and at the reaction temperature. Upon completion of the reaction, the reaction mixture is washed with water to obtain the desired product as a liquid residue.

We claim:

1. An O-chlorophenyl) O-(lower alkyl) phosphoroamidothioate having the formula

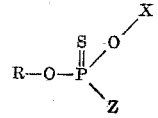

in which R represents a chlorophenyl radical, X represents a lower alkyl radical containing from 1 to 4 carbon atoms and Z represents an unsubstituted radical selected from the group consisting of aziridinyl, morpholino and pyrrolidinyl radicals.

2. O-(2,4,5-trichlorophenyl) O - methyl - 1 - aziridinyl phosphorothioate

3. O-(2,4,5-trichlorophenyl) O-methyl-1-pyrrolidinyl phosphorothioate.

4. O - (2,4,5 - trichlorophenyl) O-methyl-1-morpholino phosphorothioate.

5. O - (2,4,5 - trichlorophenyl) O - secondarybutyl-1-morpholino phosphorothioate.

6. O-(4-chlorophenyl) O-methyl-1-pyrrolidinyl phosphorothioate.

No references cited.